United States Patent [19]

Deffenbaugh

[11] 4,084,075

[45] Apr. 11, 1978

[54] ENERGY MONITOR FOR FLASH WELDERS

[75] Inventor: James F. Deffenbaugh, Warren, Ohio

[73] Assignee: Wean United Inc., Pittsburgh, Pa.

[21] Appl. No.: 577,688

[22] Filed: May 15, 1975

[51] Int. Cl.² ............................................. B23K 11/04
[52] U.S. Cl. .................................... 219/97; 219/130.33
[58] Field of Search ................. 219/97, 100, 108, 109, 219/110, 135; 324/141, 142

[56] References Cited

U.S. PATENT DOCUMENTS

| 2,286,211 | 6/1942 | Dawson et al. | 219/97 |
| 3,194,939 | 7/1965 | Hill | 219/110 |
| 3,240,961 | 3/1966 | Noth | 219/110 |
| 3,335,258 | 8/1967 | Barnhart et al. | 219/110 |
| 3,389,239 | 6/1968 | Treppa et al. | 219/110 |
| 3,445,768 | 5/1969 | Ferguson | 219/109 |
| 3,582,967 | 6/1971 | Beckman | 219/109 |
| 3,681,563 | 8/1972 | Lifshits et al. | 219/97 |
| 3,869,661 | 3/1975 | Castaigne | 324/141 |
| 3,895,212 | 7/1975 | Maxwell et al. | 219/135 |
| 3,980,857 | 9/1976 | Sciaky | 219/97 |

FOREIGN PATENT DOCUMENTS 245,224 11/1967 U.S.S.R. ................................ 219/97

OTHER PUBLICATIONS

H. R. Gates, "Welder Control Circuit," IBM Technical Disclosure Bulletin, p. 36, vol. 4, No. 9, 2/1962.

Primary Examiner—J. V. Truhe
Assistant Examiner—Clifford C. Shaw
Attorney, Agent, or Firm—Michael Williams

[57] ABSTRACT

Means for monitoring the energy used in flash welding operations wherein two signals are simultaneously fed to the input of a multiplier, one signal being substantially proportional to the welding current, and the other being substantially proportional to the welder transformer secondary voltage applied to the work. The output of the multiplier is fed to an integrating amplifier circuit and the output of the latter is fed to a level detector amplifier. Voltage changing means is used to change the sensing level of the level detector amplifier to in turn affect operation of indicating means to indicate the sensed level.

4 Claims, 6 Drawing Figures

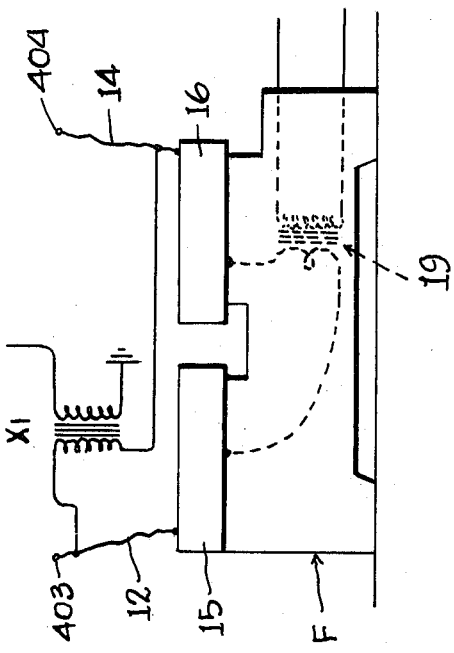
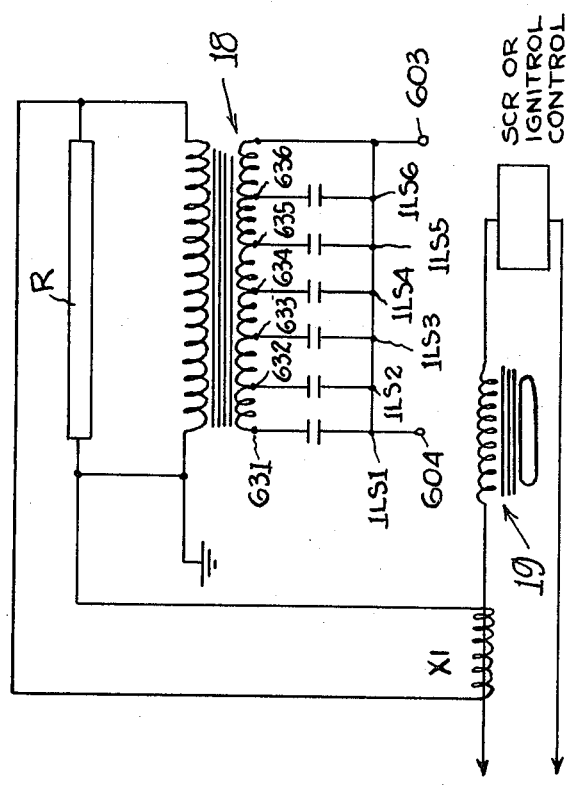
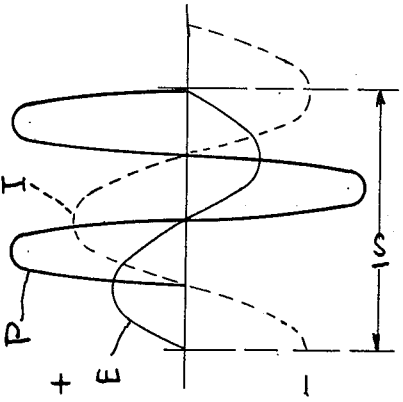
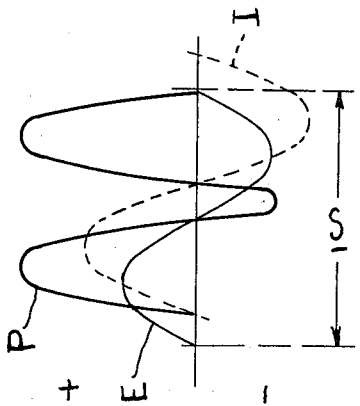
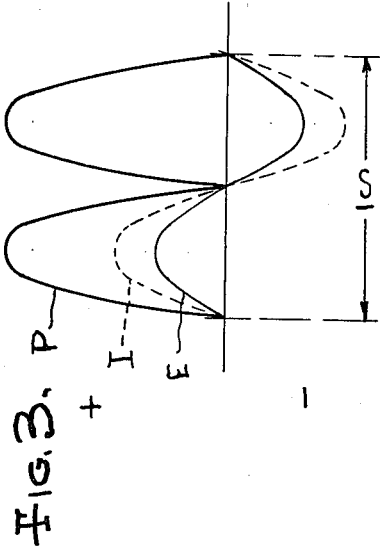

ENERGY MONITOR FOR FLASH WELDERS

BACKGROUND AND SUMMARY

The invention relates to monitoring means for determining the quality of welds made in a flash welder and comprises means for indicating whether the welds being made fall within predetermined tolerance limits.

The invention has particular usefulness in automatic assembly lines wherein metal parts are fed to flash welders, are welded, and then discharged, with little or no supervision. In the past, it was necessary at intervals to sample a welded part by tests which physically destroy the welded part. This was time-consuming and wasteful in that the sampled part resulted in scrap. The monitor is also useful to help in determining if a sound weld has been made when it is important that a weld failure does not occur in operations, such as in a pickle line.

Prior art monitoring devices are known, such as disclosed in patents to Hill U.S. Pat. No. 3,194,939; Noth U.S. Pat. No. 3,240,961, and Treppa U.S. Pat. No. 3,389,239. However, these patents require an iron core device to concentrate the flux, while I have found that this is not necessary in the monitoring means of my invention. In addition, in certain of the noted patents, the circuit must be recalibrated for each different welding condition, or requires a further circuit to compensate for inductive affects, both of which are not required in my improved circuit.

My invention provides a relatively simple but reliable means for monitoring the energy being used by a flash welding machine to make a weld, so as to not only determine weld quality, but also to provide means which give visually-observed readings at the end of each weld so that weld quality may be predicted without the requirement of destructive testing.

DESCRIPTION OF THE DRAWINGS

In the drawings accompanying this specification and forming a part of this application, there is shown, for purpose of illustration, an embodiment which my invention may assume, and in these drawings:

FIG. 2 is a diagram illustrating a portion of the welding transformer circuit and a current transformer which is used in connection with the circuit shown in FIG. 1, FIGS. 3, 4, and 5 are phase diagrams which are helpful in the disclosure of my invention, and FIG. 6 is a schematic representation of a flash welder, illustrating certain electrical connections.

DESCRIPTION OF THE PREFERRED EMBODIMENT

Figure 1:
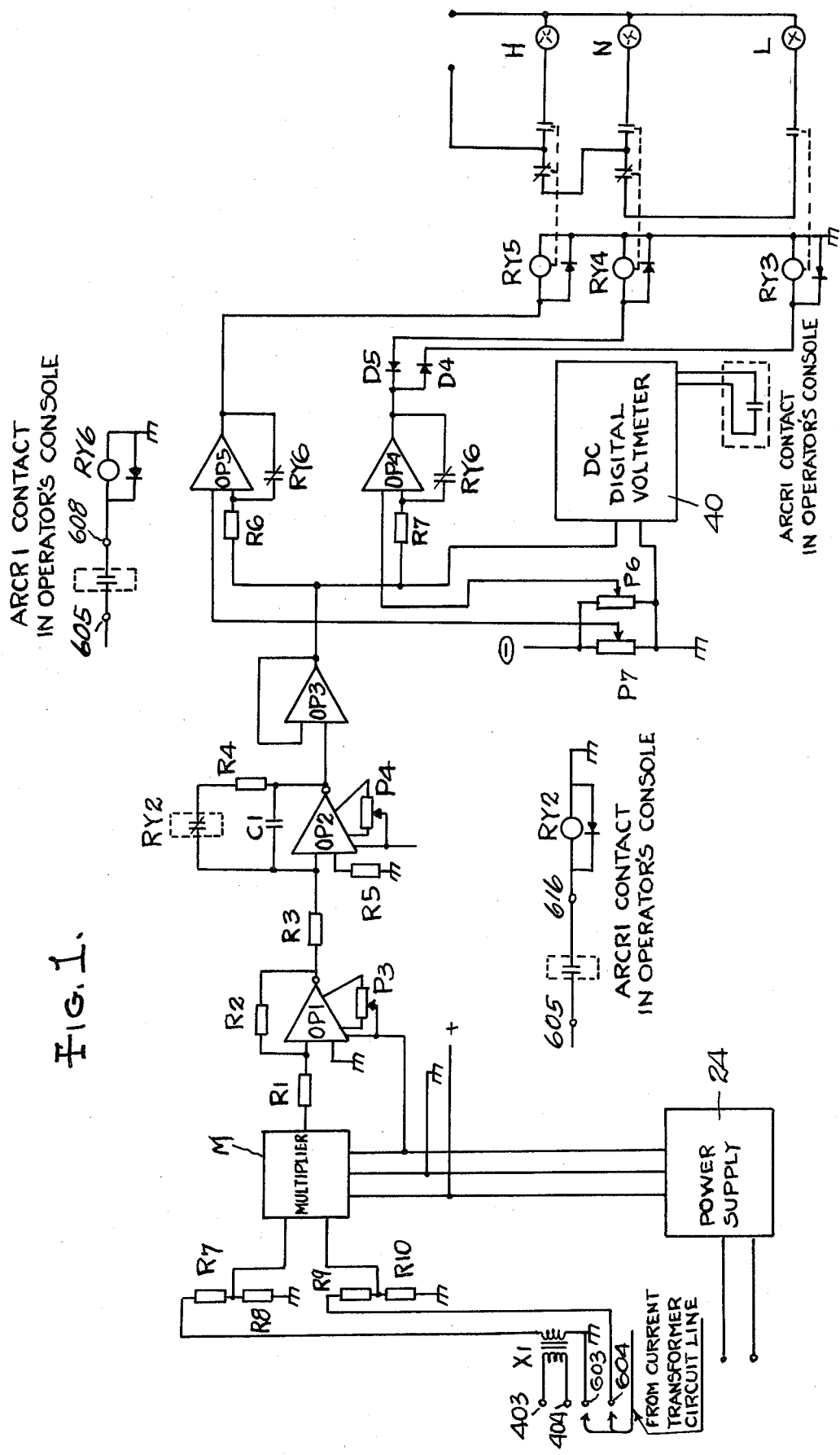
FIG. 1 is a circuit diagram showing electrical connection of the various parts comprising the preferred embodiment.

Referring particularly to FIGS. 1 and 6, the terminal points 403 and 404 are electrically connected through isolation transformer X1, by conductors 12 and 14, to respective die holders 15 and 16 of a flash welding machine F which may be of conventional construction. As seen in FIG. 2, terminals 603 and 604 are connected across a resistor R which is placed in the secondary circuit of a current transformer 2 whose primary is in series with the primary source leads to the welding transformer 19. As an alternative, the terminals 603 and 604 may be connected to the output of a Hall generator (not shown but of commercial construction) which is physically fastened to the surface of one of the secondary conductors of the welding machine transformer.

The input to the energy monitor is in the form of two alternating current voltages, one of which is proportional to the instantaneous value of the current entering the welder and the other is proportional to the instantaneous value of the welder transformer secondary voltage applied to the work. These two signals (see FIG. 1) enter resistors R7 and R9. The combination o resistor R7 and R8 forms a voltage divider so that the voltage level entering a multiplier M will not exceed the latter's limitations. The combination of resistors R9 and R10 is for the same purpose.

The multiplier M may be of a commercially available type, and that disclosed in the present embodiment is manufactured by the Burr-Brown Company, and is designated as Model 4023K. It will be appreciated that other types of multipliers may be used, but the one herein designated has been found suitable because its output is very small with no input. A power supply 24 is provided for the multiplier, and associated components, this supply having its input connected to a 120 volt AC source. The output of the supply delivers plus and minus 15 volts DC to the multiplier and associated components.

The output of the multiplier M is a voltage having a wave shape equal to the instantaneous product of the input voltage signals. If the vector, or algebraic, product is positive, the output voltage is positive, and is negative if the product is negative.

If the power factor of the welder is unity, that is, only real power, the vector product is positive for one complete half-cycle of current or voltage. For this case, the output of the multiplier M is a series of positive pulses, as seen in FIG. 3, with the time interval between zero points equal to that of one half-cycle of the voltage or current applied to the welder.

If the power factor of the welder is less than unity, that is, wherein it requires both real and reactive power, the vector product over one-half cycle of the input current or voltage will be positive and negative, as seen in FIG. 4. The output of the multiplier M will now be a series of pulses which alternate in polarity.

If the power factor of the welder is zero, the output of the multiplier will be a positive pulse followed by a negative pulse of equal magnitude, as seen in FIG. 5, with the time interval of each pulse being equal to that of one-half of the duration of either the voltage or current entering the welder. FIGS. 4 and 5 disclose a lagging power factor, but the monitor will operate equally as well with a leading power factor.

The output of the multiplier M is fed into a resistor R1 and then into an operational amplifier OP1 which may be of a commercially available type. These components, together with a resistor R2 and variable potentiometer P3, act as an inverting amplifier to increase the level of the multiplier output to a usable value. The output of amplifier OP1 is identical in shape to that of the multiplier output, but inverted and increased in value. The resistors R1, R2 and the potentiometer P3, may be of a commercially available type. The potentiometer P3 is for the purpose of compensating for off-set errors of operation of the amplifier OP1, and may be omitted with some amplifiers.

The output of amplifier OP1 is fed into a resistor R3 and an operational amplifier OP2. These components, together with a capacitor C1, resistor R5, and an adjustable potentiometer P4, form a time integrator. The potentiometer P4 performs a function similar to potentiometer P3 and, as pointed out above, may be omitted under certain conditions. The output of the integrator is a DC voltage which starts at zero and increases to a level determined by the average value of the voltage applied to resistor R3 and the time constant of the integrator and the time that the voltage is applied. The time constant of the integrator is equal, in seconds, to the product of the value of resistor R3 expressed in ohms multiplied by the value of capacitor C1, expressed in farads. If it is assumed that this product is equal to ten seconds, the magnitude of the output voltage of the integrator will be ten volts negative if the average value of the input voltage to resistor R3 is ten volts positive for ten seconds. In general, the output of the integrator is equal to the average algebraic value of the input multiplied by the time over which the input was present and divided by the integrator time constant. The output will have the opposite sign of the input. A resistor R4 and contact RY2 are shown connected in series across capacitor C1, and prevent operation of the integrator when it is not desired. These components also reset the integrator to zero by discharging capacitor C1.

The output of amplifier OP2 is fed into the non-inverting input of an operational amplifier OP3 which is used as a buffer. The buffer is a voltage follower and acts in a manner known to those skilled in the art. The output of amplifier OP3 is identical to that of the output of amplifier OP2.

The output of amplifier OP3 is fed to the non-inverting inputs of operational amplifiers OP4 and OP5, through respective resistors R7 and R6. Amplifiers OP4 and OP5 are used as level detectors, to provide Low, Normal, and High signals for the operation of indicating lights, L,N, and H.

The sensing level signal for amplifier OP4 is taken from an adjustable potentiometer P6 and produces a positive output from amplifier OP4 until the output of amplifier OP3 equals or excees the voltage level to which potentiometer P6 was set. This positive output is fed through a diode D4 and relay RY3 to energize the latter and in turn energize the Low signal light L. Amplifier OP5 likewise has a positive output but is not used at this time.

When the output of amplifier OP3, which is negative in all practical cases, exceeds the level of the setting of potentiometer P6, the output of amplifier OP4, changes to negative since the contacts of relay RY6 are open when the integrator is in use. The change from positive to negative output de-energizes relay RY3 which in turn de-energizes the Low indicating light L, and energizes relay RY4 to in turn energize the Normal indicating light N. This condition remains unchanged as long as the output signal from amplifier OP3 remains higher than the setting of potentiometer P6 and lower than the setting of potentiometer P7. If the output of amplifier OP3 never exceeds the setting of potentiometer P6 during operation of the integrator, relay RY3 remains energized and is locked in by closure of the contacts of relay RY6 when the operation of the integrator is terminated. If the operation of amplifier OP2 is terminated when the output of amplifier OP3 is higher than the setting of potentiometer P6 (resulting in energization of the Normal indicating light N), closing the contacts of relay RY6 maintains a negative output from amplifier OP4 to thus keep the Normal indicating light N on.

If the output level of amplifier OP3 exceeds the setting of potentiometer P7, the output of amplifier OP5 will change to negative. This will energize relay RY5 and de-energize light N. Energization of relay RY5 will energize the High indicating light H. If the use of amplifier OP2 is terminated during this condition, closure of the contacts of relay RY6 will maintain a negative output from amplifier OP5 to keep the High indicating light H on.

At the beginning of another integrating period (that is, when the operator presses the weld start button referred to in a control such as shown in U.S. Pat. No. 3,870,851), relay RY6 is energized to open its contacts RY6 at amplifiers OP4 and OP5 and reset the outputs to positive, thereby de-energizing either relay RY4 or RY4 and RY5 and energizing relay RY3 to bring on the Low indicating light L as the initial starting signal.

The current to the welder with which the energy monitor is used is converted to a voltage signal by either a Hall effect device (commercially available) or the current transformer X2 with a resistor R connected across its secondary windings, as seen in FIG. 2. In either case, the instantaneous value of the output voltage signal is directly proportional to the instantaneous value of the current.

If the Hall effect device is used it is physically attached to one of the secondary conductors of the welding machine transformer is well known manner. If the current transformer 18 is used, it is connected in series with one of the primary supply lines leading to the welding machine transformer.

The voltage signal is taken from a connection across the welding dies of the machine through an isolation transformer X1, which usually has a turn ratio of 1:1. The choice of the turn ratio depends on the voltage being measured and the desirable input voltage to resistor R7.

In actual use, the terminal points 403 and 404 are connected by conductors 12 and 13 to respective die holders 15, 16 of the flash welder F. Terminals 603 and 604 (see FIG. 1) are either across the resistor R which is placed in the secondary circuit of current transformer X2 whose primary is in series with the primary source leads to the welding transformer (as herein shown) or to the output of a Hall generator which is physically fastened to the surface of one of the secondary conductors of the welding machine transformer.

When the welding transformer is energized, such as when the machine operator presses the start button on the operator's console to start a welding sequence, relay ARCR1 is energized and one of its contacts is closed between terminal points 605 and 608 (see FIG. 1) to thereby energize relay RY6. Two contacts of relay RY6 which are associated with operational amplifiers OP4 and OP5 open, thereby, unclamping the output signals developed by these amplifiers during the previous welding sequence.

Closure of the contacts of relay ARCR1 between terminal points 605 and 616 (see FIG. 1) will also energize relay RY2 to open the latter's contacts which are in series with resistor R4 paralleling capacitor C1 of operational amplifier OP2. This permits capacitor C1 to begin charging to integrate the output of the multiplier M. As the welding sequence progresses, the output of amplifier OP3 is proportional to the energy input to the welding machine. At the end of the welding sequence relay ARCR1 is deenergized to thereby discharge the capacitor C1 and clamp the outputs of amplifiers OP4 and OP5 so as to retain indicating light status until the start of the next welding sequence. This will give the machine operator a visual indication as to whether or not a good quality weld was made.

A commercially available DC digital voltmeter 40, (see FIG. 1) is connected between the output of amplifier OP3 and common. The indication of this meter is proportional to the energy input to the welding machine at any instant of time during the operation of the monitor. When relay ARCR1 is de-energized (such as at end of a welding sequence) one of its contacts is used to clamp the meter indication as it was at the end of the welding sequence. This indication will thus remain until the start of the next welding sequence, to thereby provide a further and more detailed indication for the machine operator as to the quality of the weld made during the monitored sequence. The meter indication can be used as an actual energy value by applying the proper constant to the meter reading. This can be in any convenient units, such as watt-seconds, kilowatt-seconds or megowatt-seconds.

There is a difference between the operation of the monitor circuit when using the Hall effect device compared with the use of the current transformer X2. This results from the fact that it is usual to supply flash welding machine transformers with taps on the primary windings to that the primary to secondary turn ratio may be changed as required for different welding operations. For example, assume that the turns ratio of the welding transformer is "N". The current in the current transformer 18 will then be equal to the machine secondary current divided by "N". Now, assume that the ratio is changed to "2N". For the same secondary current value, the current in the current transformer X2 will now be equal to the secondary current divided by "2N" or one-half of that for the "N" turn ratio case. Assuming that the voltage across the welding machine dies 15 and 16 was unchanged in either case, the power and energy would have remained the same for either case. However, the output of the current transformer X2 would be one-half for turn ratio "2N", giving a power and energy output equal to only one-half of that actually existing.

In order to eliminate this variation, the circuit shown in FIG. 2 is used in connection with a tapped transformer 18. The input to this transformer is the voltage proportional to the secondary current of the current transformer which is connected in one of the supply lines to the primary of the welding machine transformer so that its output is thus proportional to the transformer primary current. From the example given above, the contacts shown between points 636 and 1LS6, would have been closed for the "N" turn ratio case. For the "2N" case, the contact between point 631 and 1LS1 would have been closed. Since this doubles the turn ratio of the transformer connected across the current transformer 18, its output will now be the same even through the current in the secondary of the current transformer has been reduced to one-half of its value.

Of course, other turn ratios may be used, and the transformer shown in FIG. 2 is designed so that its taps are in the inverse of the taps of the welding machine transformer. Thus, for each welding machine transformer turn ratio, a turn ratio may be selected in the tapped transformer so that its output is proportional to the secondary current of the welding machine transformer. The selection of the proper contact to close in the tapped transformer is automatically selected by a known switching means mounted on the machine welding transformer tap switch mechanism so that as this tapswitch is moved to different welding machine transformer taps, the proper tap of the tapped transformer is automatically selected.

Where the energy monitor is supplied for an exisiting machine, automatic tap selection is not available since the transformer tap switch is usually not changed. For this case, the proper turn ratio of the tapped transformer is selected by a manual selector switch mounted on the operator's control console.

Since the Hall effect device measures the secondary current directly, no current transformer is required. However, the Hall effect is not as desirable since it is not usually rugged and its output voltage is relatively low.

FIG. 1 shows the energy output meter 40 connected to the output of amplifier OP3. In some cases, this is not a separate meter but may be the meter supplied for indicating the position of the welding dies. A switch is provided to select either a die position read-out or an energy read-out. Instead of utilizing the monitor only as an indicating device, the output of the monitor may be used to give the degree of automatic correction by inserting such output in a feedback system.

I claim:

1. Means for monitoring the energy used in welding work pieces by use of a flash welder having welding transformer means, comprising:
   a four quadrant multiplier, having two inputs,
   means electrically connecting to one of the inputs of said multiplier a first signal which is substantially proportional to the instantaneous value of the total current required to make a flash weld,
   means electrically connecting to the other input of said multiplier a second signal which is substantially proportional to the instantaneous value of the voltage applied across the work pieces being flash welded, said instantaneous values being derived at a substantially simultaneous time,
   said multiplier multiplying the instantaneous values of said current and said voltage to produce an output which is proportional to the product of the said inputs, to thereby produce a signal which is proportional to the instantaneous values of the real and reactive power of the flash welding machine circuit from which the said two inputs are derived,
   means electrically connecting the output of said multiplier to the input of an integrating circuit, the latter having an output which is substantially proportional to the energy required by the flash welding operation,
   and means affected by the output of said integrating circuit to provide for modification of the flash welding operation in accordance with variation of energy required to make a satisfactory flash weld.

2. The monitoring means according to claim 1 wherein said first signal is generated by a current transformer which is responsive to the current in a source line feeding the primary of said welding transformer means.

3. The monitoring means according to claim 2 wherein a resistor is connected across the output of said current transformer to transform the current signal to a voltage signal.

4. The monitoring means according to claim 1 wherein said first signal is generated by a Hall effect device which is responsive to the welding current.

* * * * *